United States Patent [19]

McDaniel et al.

[11] 4,243,760

[45] Jan. 6, 1981

[54] REACTION INJECTION MOLDED POLYURETHANE

[75] Inventors: Kenneth G. McDaniel, Round Rock; Doris M. Rice; Michael Cuscurida, both of Austin, all of Tex.

[73] Assignee: Texaco Development Corporation, White Plains, N.Y.

[21] Appl. No.: 41,837

[22] Filed: May 23, 1979

[51] Int. Cl.³ .................. C08G 18/14; C08G 18/48; C08G 18/32

[52] U.S. Cl. ............................ 521/176; 264/53; 264/DIG. 83; 521/112; 521/126; 521/127; 521/129; 521/131; 521/133; 521/914

[58] Field of Search .................. 521/176, 914; 528/77

[56] References Cited

U.S. PATENT DOCUMENTS

| | | | |
|---|---|---|---|
| 3,535,307 | 10/1970 | Moss et al. | 521/175 |
| 3,630,973 | 12/1971 | Ardis et al. | 521/176 |
| 3,857,800 | 12/1974 | Fishbein et al. | 521/176 |
| 4,065,410 | 12/1977 | Scheefer et al. | 521/51 |
| 4,125,505 | 11/1978 | Critchfield et al. | 260/33.2 R |
| 4,126,742 | 11/1978 | Carleton et al. | 528/57 |

Primary Examiner—H. S. Cockeram
Attorney, Agent, or Firm—Carl G. Ries; Robert A. Kulason; James L. Bailey

[57] ABSTRACT

Covers a polyurethane elastomer of improved moldability, particularly useful in RIM applications which comprises the reaction product of an aromatic polyisocyanate, a high molecular weight polyether triol containing an internal mixed propylene oxide-ethylene oxide segment comprising 2–35% ethylene oxide by weight and 65–98% by weight of propylene oxide and an ethylene oxide cap such that said polyol has a primary hydroxyl content greater than 50% and preferably greater than 90%, and a chain-extending agent. Also covers the method of making said elastomer.

12 Claims, No Drawings

REACTION INJECTION MOLDED POLYURETHANE

BACKGROUND OF THE INVENTION

1. Field of the Invention

This invention relates to the manufacture of molded articles by reaction injection molding of a urethane composition. It is more particularly concerned with RIM formulations particularly characterized as having improved moldability.

2. Description of the Prior Art.

A recent advance in the area of urethane technology has been the use of reaction injection molding, also known as RIM. This method of molding uses high pressure, multi-stream, high velocity impingement whereby essentially instantaneously mixing is effected. In RIM technology the mixed urethane foam ingredients are injected into the mold cavity through a runner and gate at low pressures, usually about 20 psi, where they react very quickly to produce the molded article. Large parts can thereby be produced at low mold pressures—generally less than 60 psi.

Such elastomers normally comprise the reaction product of an aromatic polyisocyanate, a polyol and a chain-extending agent.

One type of polyol employed is a blocked polypropylene glycol with an ethylene oxide cap to form a low flex modulus elastomer. Said polyol usually comprises a glycol initiator having an internal blocked polypropylene oxide segment with a polyethylene oxide cap. See, for example, U.S. Pat. Nos. 3,535,307 and 2,125,505 and R. M. Gerkin and F. E. Critchfield, "Factors Affecting High and Low Temperature Performance in Liquid Reaction Molding Urethane Elastomers", SAE paper presented at Automative Engineering Meeting in Toronto, October, 1974.

However, while elastomers from polyols of the type just described have significant utility in the RIM area, they do possess some drawbacks, particularly with respect to molding properties. For example, in using such polyols it has been noted that a buildup of urethane residue occurs on the mold surface. In addition, there is noted some cracking of the skin if the part is bent during molding. Lastly, the part so molded in many instances demonstrates shrink marks.

It would be a particular improvement in the art if the above type of polyols could be somehow improved so as to rectify the moldability problems and thus produce suitable flexible elastomers for applications such as automobile fascia and other parts.

It therefore becomes an object of the invention to minimize the just discussed problems with moldability or eliminate same by resorting to an improved reaction injection molding polyurethane formulation containing a specific class of high molecular weight polyols designed specifically to aid in enhancing demolding properties of elastomers therefrom.

SUMMARY OF THE INVENTION

This invention comprises reaction injection molding polyurethane formulations having improved moldability and other properties comprising the reaction product of an aromatic polyisocyanate, a high molecular weight polyether triol containing an internal mixed propylene oxide-ethylene oxide segment comprising 2–35% ethylene oxide and 65–98% propylene oxide and an ethylene oxide cap such that said polyol has a primary hydroxyl content greater than 50% and preferably greater than 90%, and a chain-extending agent. This invention is also concerned with the method of making polyurethane elastomers.

DETAILED DESCRIPTION OF THE INVENTION

The polyurethane compositions here used in making RIM elastomers are prepared in the usual manner using conventional techniques. The polyol employed here in making the foam formulation comprises the gist of the invention. This high molecular weight polyether triol should contain an internal mixed propylene oxide-ethylene oxide segment. In said segment the ethylene oxide comprises 2–35% by weight and preferably 3–30% by weight and the propylene oxide 65–98% by weight and preferably 70–97% by weight. The terminal portion of the molecule contains an ethylene oxide cap so that said polyol has an overall primary hydroxyl content greater than 50% and usually greater than 90%. Usually the polyol has an equivalent weight ranging from about 1300 to about 3000.

To prepare said polyol useful in the invention a wide variety of initiators may be chosen so as to produce polyether or polyester polyols. It is greatly preferred that the polyol be a polyether polyol.

Typically a trihydroxy initiator is reacted with an alkylene oxide in the conventional manner to achieve the high molecular weight material. Typical initiators which may be alkoxylated include, for example, hexanetriol, 1,3,3-tris(hydroxypropoxyphenyl) propane, mixtures of the above, etc.

The above initiators are then reacted with an alkylene oxide comprising propylene oxide and ethylene oxide. The reaction of initiator with alkylene oxide may be sequential, that is, first reaction with propylene oxide followed by reaction with ethylene oxide or vice versa. In yet another embodiment the initiator may be reacted with a mixture of ethylene oxide and propylene oxide. All that is essential is that the internal segment comprise ethylene oxide and propylene oxide in the amounts set forth above. Lastly, the reaction is completed by capping the molecule with ethylene oxide so that the polyol has a primary hydroxyl content greater than 50%. A primary hydoxyl content of greater than 90% is preferred.

The chain-extending agent may be chosen from a wide variety of chain-extenders which typically include glycols of the type described above as polyol initiators. Among these ethylene glycol, propylene glycol, 1,4-butanedial glycol, hydroquinone dibetahydroxyethyl ether may be used. Greatly preferred are ethylene glycol and 1,4-butanediol glycol.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, napthalene-1,4-diisocyanate, bis (4-isocyanatophenyl) methane, bis(3-methyl-4-isocyantophenyl) methane, and 4,4'-diphenylpropane diisocyanate.

Other aromatic polyisocyanates used in the practice of the of the invention are methylene-bridged polyphenyl polyisocyanate mixture which have a functionality of from about 2 to 4. These latter isocyanate compounds are generally produced by the phosgenation of corresponding methylene bridged polyphenyl polyamines, which are conventionally produced by the reaction of formaldehyde and primary aromatic amines, such as aniline in the presence of hydrochloric acid and/or other catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate used here is methylene bis(4-phenylisocyanate) or MDI. Pure MDI, quasi- prepolymers of MDI, modified pure MDI, etc. materials of this type may be used to prepare suitable RIM elastomers. Examples of commercial materials of this type are Upjohn's Isonate 125 M (pure MDI) and Isonate 143L ("Liquid" MDI).

The foam formulation includes a great number of other recognized ingredients usually present in the polyol blend, such as additional cross-linkers, catalysts, extenders, blowing agents and the like. Blowing agents may include halogenated low-boiling hydrocarbons, such as trichloromono-fluoromethane, methylene chloride, carbon dioxide, nitrogen, etc., used. Catalyst such as tertiary amines or an organic tin compound or other polyurethane catalysts may be used. The organic tin compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Tertiary amine catalysts include trialkylamines (e.g. trimethylamine, triethylamine), heterocyclic amines, such as N-alkylmorpholines (e.g., N-methylmorpholine, N-ethylmorpholine, etc.), 1,4-dimethylpiperazine, triethylenediamine, etc., and aliphatic polyamines, such as N,N,N'N'-tetramethyl-1,3-butanediamine.

Other conventional formulation ingredients may also be employed, such as, for example, foam stabilizers, also known as silicone oils or emulsifiers. The foam stabilizer may be an organic silane or siloxane. For example, compounds may be used having the formula:

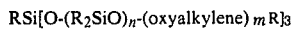

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

The invention will be illustrated further with respect to the following specific examples, which are given by way of illustration and not as limitations on the scope of this invention.

EXAMPLE 1

A conventional polypropylene, glycol, of a molecular weight of about 6500 blocked with ethylene oxide and containing an ethylene oxide cap. Thanol SF-6500 (85 pbw), ethylene glycol (15 pbw), catalyst (1.0 pbw), and dibutylin dilaurate (0.125 pbw) were premixed and charged into the B-Component working tank of an Admiral 40 lb/min. low pressure mechanical mix foam machine. Isonate 143L ("liquid"MDI) (77.72 pbw), and fluorocarbon-11B (4.0 pbw) were premixed and charged into the A-Component working tank. The A-Component temperature was adjusted to 80° F., and the B-Component temperature was adjusted to 120° F. The machine was calibrated to deliver 6078 g/min A-Component and 7542 g/min B-Component (isocyanate/hydroxyl ratio—1.05). The ingredients were then mixed via a spiral-type mixer turning at 4500 rpm and injected into a 15 in. ×15 in. 0.150 in. steel mold preheated to 145° through a gating system which was built into the mold. A 3-second shot yielded a flat plaque having an overall density of about 62 pcf. Release time was 45 seconds from end of pour. The part exhibited an inferior green strength with shrink marks. (Physical properties, see Table 1).

EXAMPLE 2

A polyol of the invention having an equivalent weight of 2300 and a primary hydroxyl content of 96 percent (Internal segment 96.4% PO and 3.6% EO) (85 pbw), ethylene glycol (15 pbw), triethylene diamine catalyst (0.05 pbw), and dibutyltin dilaurate (0.2 pbw) were used as the B-Component. The A-Component consisted of Isonate 143L (77.57 pbw), methylene chloride (1 pbw), and Fluorocarbon-II (3 pbw). The parts were prepared as above at a 1.05 index. The parts exhibited good green strength with only minor shrinkage. (Physical properties, see Table 1).

EXAMPLE 3

A polyol of the invention having a 6500 molecular weight and a primary hydroxyl content of 90% (Mixed Oxide: 96.4 percent propylene oxide—3.6 percent ethylene oxide); 64 pbw, 1,4-butanediol, 20.8 pbw, triethylenediamine 33 percent in ethylene glycol. 125 pbw, and dibutylin dilaurate, 0.15 pbw, was used as a B-Component with an A-Component of Isonate 143, 74.58 pbw, methylene chloride, 2.0 pbw, and Freon 11B, 2 pbw. The elastomers were poured as given in Example 1 at a 1.05 index. (Physical properties, see Table 1).

As can be seen from Table 1, elastomers prepared from polyols of the invention, namely Examples 2 and 3 exhibited greatly enhanced physical properties compared to the Example 1 control, particularly in terms of flex modulus. In addition, one should note the improvement in tensile tear, elongations and heat sag values using the polyols of the invention versus the controlled polyol which does not contain in the mixed segment of the molecule any ethylene oxide.

Table 1

| Sample | Physical properties[a] | | |
|---|---|---|---|
| | Example 1 | Example 2 | Example 3 |
| Tensile (psi) | 2596 | 3812 | 3878 |
| Elongation (9%) | 225 | 278 | 238 |
| Tear (psi) | 278 | 370 | 537 |
| Flex Modulus (psi) | | | |
| 75° F. | 19102 | 24095 | 58569 |
| 158° F. | 13315 | 16567 | 26805 |
| −20° F. | 37715 | 57241 | 146835 |
| Heat Sag (in.) | .64 | .45 | .32 |
| Resilience° at | | | |
| 30 sec. | 10 | 8 | 11 |
| 5 min. | 5 | 1.5 | 4 |

[a]Tensile strength (ASTM D-412), psi
Elongation (ASTM D-412); %
Tear strength (ASTM D-624,DieC),pli
Heat sag (Chevrolet test method CT222006AA, in.)
Flexural modulus (ASTM D-790), 25° C.,psi

EXAMPLE 4

Yet another polyol of the invention was prepared and used with ethylene glycol chain-extender to prepare a series of elastomers with a 75° F. flex modulus ranging from 5,600 psi to 82,800 psi. The polyol itself was prepared by reacting glycerin with propylene oxide and ethylene oxide to yield a molecule having its internal segment comprising 3.6% ehtylene oxide and 96.4% propylene oxide. The reaction was then followed by capping the molecule with ethylene oxide to produce a final polyether polyol having a molecular weight of 6500 and a primary hydroxyl content of 90%.

Elastomers were produced from said above polyol in the manner described in Example 1 using a Cincinnati Milacron LRM-II machine with processing conditions as given by Table 2. The physical properties of the elastomers are given in Table 3.

Table 2

| Formulation, pbw | |
|---|---|
| Polyol component: | |
| Example 4 Polyol | 100 |
| Dibutyltin dilaurate | 0.15 |
| THANCAT TD-33 | 0.05 |
| Fluorocarbon-11B | 2.0 |
| Chain extender: | |
| Ethylene glycol | Variable (10–25% of total B-Component) |
| Isocyanate: | |
| Isonate 143L | 1.05 index |
| Processing Details | |
| B-Component temperature, °F. | 100 |
| A-Component temperature, °F. | 80 |
| Mold temperature, °F. | 160 |
| Release time, sec | 30 |
| Machine employed | CM LRM-2 |
| Mold Construction | Ni plated steel |
| Mold size | 0.150" × 24" × 48" |
| Mold release | RIMLEASE 1535 (Contour Chem.) |
| Post cure time/temperature | 1 hr/250° F. (ASAP after pour) |

Table 3

RIM Formulations Based on Example 4 Polyol Properties vs. EG Level

| | Ratio, B-Comp/EG* | | | |
|---|---|---|---|---|
| | 90/10 | 85/15 | 80/20 | 75/25 |
| | 1.05 Isocyante Index | | | |
| Tensile, psi | 2320 | 3440 | 3810 | 4185 |
| Elongation, % | 253 | 270 | 193 | 193 |
| Tear, pli | 200 | 348 | 498 | 561 |
| Flexural modulus, psi | | | | |
| 75° F. | 6400 | 21400 | 49100 | 92800 |
| 158° F. | 5600 | 14000 | 29700 | 51700 |
| −20° F. | 14400 | 60500 | 111800 | 170000 |
| Ratio-20° F./158° F. | 2.57 | 4.32 | 3.76 | 3.29 |
| Heat sag, 250° F., in | 0.47 | 0.25 | 0.05 | — |
| Resilience, degrees | | | | |
| 30 sec | 0.5 | 6 | 19 | 14 |
| 5 min. | 0°/2 min | 0.5 | 6 | 9 |

*Ethylene glycol premixed in polyol component

EXAMPLE 5

An additional polyol of the invention was prepared having an internal segment comprising 85% propylene oxide and 15% ethylene oxide. The initiator was glycerin. The polyol had a molecular weight of 6500, and was capped with ethylene oxide to produce a final polyol having a primary hydroxyl content of 90%. 65 parts by weight of this polyol, 15 parts by weight of ethylene glycol, 0.1 parts by weight of dibutyltin dilaurate, and 30% triethylenediamine catalyst and ethylene glycol in an amount of 0.05 parts by weight were used as the B-Component. As an A-Component Isonate 140L, 67.9 parts by weight, Freon 11B, 2 parts by weight and methylene chloride, 2 parts by weight were employed to prepare an elastomer according to the procedure of Example 1.

The above elastomer exhibited good green strength and left a clean mold. Physical properties are given in Table 4.

EXAMPLE 6

As a control of Example 5 a polyether polyol was employed. This particular polyol was prepared in a manner almost identical to that of Example 5 except that a mixture of glycerol and propylene glycol was employed as the initiator. The average functionality was about 2.1, the primary hydroxyl content about 90%, and the equivalent weight about 1750. The procedure given in Example 1 was used to prepare an elastomer with a B-Component as follows: Polyol, 60 pbw, ethylene glycol, 15 pbw, 33% triethylenediamine in ethylene glycol, 0.1 pbw and dibutylin 10 dilaurate, 10.75 pbw, and an A-Component as follows: Isonate 143L, 77.22 pbw, Freon 11B, 2 pbw, and methylene chloride, 2 pbw.

The elastomer prepared here exhibited poor green strength, was brittle and showed shrink marks. Physical properties are also given in Table 4. This example illustrates the superiority of triols over diols of the invention.

TABLE 4

| | Example 5 Polyol | Example 6 Polyol |
|---|---|---|
| Tensile | 4221 | 4161 |
| Elongation | 267 | 270 |
| Tear | 504 | 581 |
| Flex Modulus | | |
| 75° F. | 44838 | 59909 |
| 158° F. | 30453 | 35317 |
| −20° F. | 126998 | 125599 |
| Heat Sag | .3 | .175 |

We claim:

1. A reaction injection molded polyurethane elastomer having improved moldability and other improved properties comprising the reaction product of an aromatic polyisocyanate, a high molecular weight triol containing an internal mixed propylene oxide-ethylene oxide segment comprising 2-35% by weight of ethylene oxide and 65-98% by weight of propylene oxide and an ethylene oxide cap such that said triol has a primary hydroxyl content greater than 50% and a chain-extending agent.

2. The polyurethane of claim 1 wherein said triol has an equivalent weight of 1300-3000.

3. The polyurethane of claim 1 wherein said aromatic polyisocyanate is methylene bis(4-phenylisocyanate).

4. The polyurethane of claim 1 wherein said chain-extending agent is ethylene glycol.

5. The polyurethane of claim 1 wherein said chain-extending agent is 1,4-butanediol.

6. The polyurethane of claim 1 wherein said high molecular weight triol is a polyether triol having a primary hydroxyl content greater than 90%.

7. A method of making a polyurethane elastomer of improved moldability which comprises injecting via a RIM machine into a mold cavity of the desired configuration a foam formulation and demolding the molded article, said formulation being the reaction product of an aromatic polyisocyanate, a high molecular weight triol containing an internal mixed propylene oxide-ethylene oxide segment comprising 2-35% by weight of ethylene oxide and 65-98% by weight of propylene oxide and an ethylene oxide cap such that said triol has a primary hydroxyl content greater than 50%, and a chain-extending agent.

8. The method of claim 7 wherein said high molecular weight triol has an equivalent weight of from about 1500 to about 3000.

9. The method of claim 7 wherein said aromatic polyisocyanate is methylene bis (4-phenylisocyanate).

10. The method of claim 7 wherein chain-extending agent is ethylene glycol.

11. The method of claim 7 wherein said chain-extending agent is 1,4-butanediol.

12. The method of claim 7 wherein said high molecular weight is a polyether triol and has a primary hydroxyl content greater than 90%.

* * * * *